(12) United States Patent
Eluard et al.

(10) Patent No.: US 11,549,577 B2
(45) Date of Patent: Jan. 10, 2023

(54) ROLLER GEARING ELEMENT

(71) Applicant: Safran Landing Systems, Velizy-Villacoublay (FR)

(72) Inventors: Gilles Eluard, Velizy-Villacoublay (FR); Stéphane Lambre, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 182 days.

(21) Appl. No.: 15/927,874

(22) Filed: Mar. 21, 2018

(65) Prior Publication Data
US 2018/0274650 A1    Sep. 27, 2018

(30) Foreign Application Priority Data

Mar. 22, 2017 (FR) ...................... 1752380

(51) Int. Cl.
| | | |
|---|---|---|
| *F16H 55/10* | (2006.01) | |
| *F16H 57/04* | (2010.01) | |
| *B64C 25/40* | (2006.01) | |
| *F16C 19/36* | (2006.01) | |
| *F16C 33/66* | (2006.01) | |
| *F16H 55/17* | (2006.01) | |

(52) U.S. Cl.
CPC ........... *F16H 55/10* (2013.01); *B64C 25/405* (2013.01); *F16C 19/36* (2013.01); *F16C 33/6659* (2013.01); *F16H 55/17* (2013.01); *F16H 57/043* (2013.01); *F16H 57/0464* (2013.01); *F16H 57/0471* (2013.01)

(58) Field of Classification Search
CPC ............... B64C 25/405; F16C 33/6603; F16C 33/6659; F16H 55/10; F16H 55/17; F16H 57/04; F16H 57/043; F16H 57/0464; F16H 57/0471; F16H 57/063; F16H 57/048; G04B 13/02; G04B 13/026
See application file for complete search history.

(56) References Cited

U.S. PATENT DOCUMENTS 594,110 A * 11/1897 Higgins ................... F16H 55/10
                                                            74/465
1,140,427 A *  5/1915 Wilson .................... F16H 55/10
                                                            74/465

(Continued)

FOREIGN PATENT DOCUMENTS

WO        2015/140519 A1      9/2015

OTHER PUBLICATIONS

French Search Report and Written Opinion dated Nov. 23, 2017, issued in corresponding French Application No. 1752380, filed Mar. 22, 2017, 8 pages.

*Primary Examiner* — Jake Cook
*Assistant Examiner* — Gregory Robert Weber
(74) *Attorney, Agent, or Firm* — Christensen O'Connor Johnson Kindness PLLC

(57) ABSTRACT

An improved serviceability gearing element generally includes a support having a plurality of obstacles for co-operating with teeth of a neighboring gearing element. The gearing element further includes a pin, a roller mounted to move in rotation about the pin via a rotary guide, blocking bearings shaped substantially to prevent the roller from moving in translation along the pin, and one or more fasteners for fastening at least one of the blocking bearings to the support.

12 Claims, 2 Drawing Sheets

(56) References Cited

U.S. PATENT DOCUMENTS

| | | | | |
|---|---|---|---|---|
| 1,200,203 | A * | 10/1916 | Kroyer | F16H 55/10 |
| | | | | 74/465 |
| 2,293,907 | A * | 8/1942 | Le Bus | F16H 1/24 |
| | | | | 74/415 |
| 8,893,569 | B2 * | 11/2014 | Lim | F16H 19/04 |
| | | | | 184/6.12 |
| 9,068,632 | B2 * | 6/2015 | Lim | F16H 19/04 |
| 9,341,247 | B2 * | 5/2016 | Lim | F16H 19/04 |
| 10,513,328 | B2 * | 12/2019 | Didey | F16B 5/10 |
| 2011/0300978 | A1 * | 12/2011 | Sakamoto | F16H 55/10 |
| | | | | 474/162 |
| 2017/0370459 | A1 * | 12/2017 | Lim | F16H 19/04 |
| 2019/0346024 | A1 * | 11/2019 | Nagumo | F16C 19/26 |

\* cited by examiner

ROLLER GEARING ELEMENT

BACKGROUND

In the field of aviation, provision is now made to fit aircraft with members for driving wheels in rotation so as to enable an aircraft to move on the ground without using its aeroengines. In general, such drive members comprise an electric motor connected to reduction gearing having an outlet fitted with a pinion. The pinion co-operates with a toothed ring secured to the aircraft wheel. In that way, the electric motor drives the pinion in rotation, which in turn drives the toothed ring, and thus the wheel, so as to move the aircraft.

Naturally, the above-described type of drive requires the use of an electric motor that delivers a large amount of torque. The gearing formed by the pinion and the toothed ring must then mesh without slip and must present clearance that is as small as possible in order to withstand torque from the motor, in particular while starting when the torque is delivered relatively suddenly.

Gearing of that type is made possible by using a roller pinion, in particular as proposed by the supplier NEXEN® under the name Roller Pinion System (RPS).

The RPS type of pinion comprises a plurality of rollers that are to co-operate with the teeth of a toothed wheel or of a rack. The rollers are mounted on their gearing element so as eliminate slip relative to the teeth of the neighboring gearing element. At all times, two rollers are in contact with a given tooth of the neighboring gearing element, so as to enable transmission to take place without clearance and with very high relative efficiency.

When applying motor drive to an aircraft wheel, the operating environment of such a drive member is particularly constraining. Specifically, the wheel of an aircraft is subjected to high temperature levels, in particular during stages of braking while landing, in which a natural thermal convection and conduction stream becomes established between the braking system and the wheel. The wheel is also exposed to impacts from external elements (e.g., by pebbles, grains, and other debris) that are projected at high speed, and to being sprayed with any water present on the runway. Under these operating conditions, the risk of the rollers of the pinion being damaged or suffering premature wear is significant.

As a result of the design, an RPS pinion roller can be replaced only by completely dismantling the pinion, thereby leading to excessive maintenance time and costs that are not negligible.

SUMMARY

The present disclosure relates generally to a gearing element, for example, but not exclusively, to a motor-driven wheel of an aircraft.

In accordance with one embodiment of the present disclosure, a gearing element is provided. The gearing element generally includes a support having a plurality of obstacles mounted thereon for co-operating with teeth of a neighboring gearing element. In some embodiments, each of the obstacles comprises a pin having at least one roller mounted to rotate thereon via a rotary guide. In these embodiments, each obstacle also comprises, for example, blocking bearings shaped substantially to prevent movements in translation of the roller along the pin, and one or more fasteners for fastening at least one of the blocking bearings to the support.

The obstacles can thus be dismantled independently of one another from the support of the gearing element. In this way, when a roller is damaged or worn to such an extent as to put proper operation of the gearing in question, only the obstacle that includes the roller in question is removed. The time, and thus the cost, of maintenance are thus reduced.

In one embodiment of the present disclosure, the support comprises a central core having ends carrying end plates provided with facing openings, each receiving a portion of the blocking bearing.

In some embodiments, each obstacle comprises two rollers with an axial space between them in order to uncover a portion of the blocking bearing, and the support has an intermediate plate provided with openings, the openings facing openings in the end plates and each receiving the portion of the blocking bearing.

According to embodiments of the present disclosure, the rotary guide is configured to guide rotation of at least one of the obstacles and comprises, for example, at least one bearing, such as a roller bearing. In some embodiments, the bearing is, for example, a needle bearing.

According to embodiments of the present disclosure, at least one of the blocking bearings comprises a nut and a blocking neck centered on the axis. The nut is then screwed onto a threaded end of the pin in order to hold the blocking neck pressed against a shoulder of the pin.

In one embodiment, the blocking bearings are shaped to receive dynamic gaskets arranged to provide sealing between the roller and the pin of the obstacle.

In another embodiment of the present disclosure, at least one of the obstacles includes lubrication means for lubricating the rotary guide.

In some embodiments, the lubrication means includes a lubrication channel configured and arranged to supply lubrication to the rotary guide. In some embodiments, the lubrication means comprise at least one channel extending inside the pin and penetrating into one of the blocking bearings arranged to receive a grease fitting. The channel then communicates with the rotary guide.

In some embodiments, the one or more fasteners comprise screws, each having a shank passing through one of the blocking bearings and a threaded portion screwed into the support.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

Figure 1:
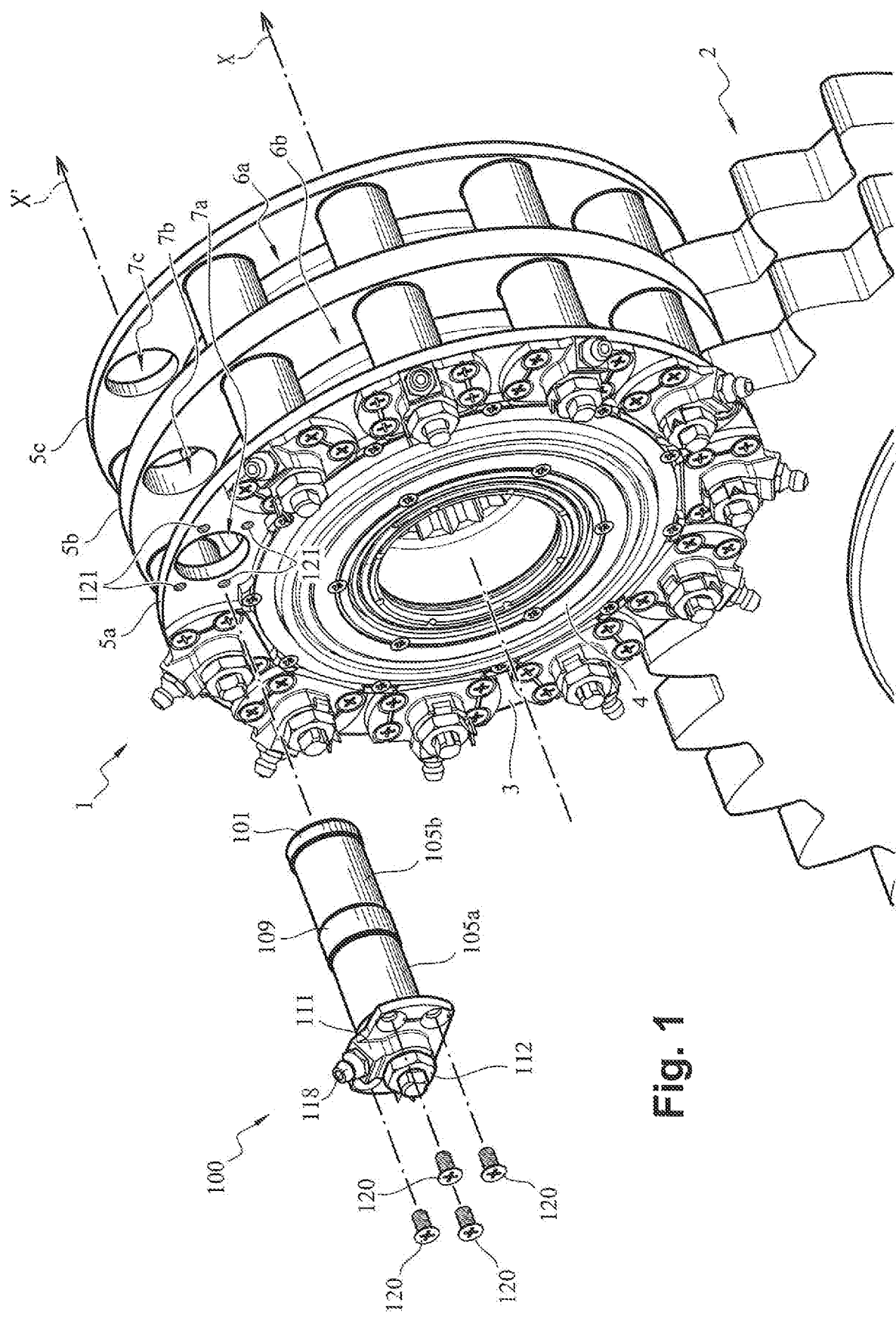
FIG. 1 is a perspective view of one representative embodiment of a gearing element, in which obstacles co-operate with the teeth of a toothed ring, in accordance with an aspect of the present disclosure.

The following description provides several examples that relate to a gearing element. With reference to FIG. 1, a gearing element 1 in some embodiments of the present disclosure is in contact with a toothed ring 2 having two rows of teeth. In the illustrated embodiment, the gearing element 1 has an axis of rotation X parallel to an axis of rotation of the toothed ring 2.

The gearing element 1 further comprises a support 3 having a plurality of obstacles 100 mounted thereon, where the obstacles are symmetrically distributed around the axis of rotation X. The support 3 has a central core 4 of shape that can be considered to be that of a right tube of longitudinal axis coinciding with the axis of rotation X of the gearing element 1.

In the embodiment shown, the support 3 also includes a first end plate 5a, a second end plate 5c, and an intermediate plate 5b, all carried by the central core 4 of the support 3. The end plates 5a and 5c are carried by the ends of the central core 4, the intermediate plate 5b being arranged halfway between the end plates 5a and 5c. The general shape of the end plates 5a and 5c and of the intermediate plate 5b comprises flat circular annuluses of central axis coinciding with the axis of rotation X. The plates 5a, 5b, and 5c are identical in diameter which diameter is greater than the diameter of the central core 4. The thickness of the intermediate plate 5b is substantially twice the thickness of the first and second end plates 5a and 5c. The plates 5a, 5b, and 5c project laterally from the central core 4 such that the plates 5a, 5b, and 5c form first and second grooves 6a and 6b of substantially identical width each having its bottom constituted by the outside surface of the central core 4.

In some embodiments, the first end plate 5a has openings 7a that are symmetrically distributed around the axis of rotation X in the vicinity of the outer periphery of the first end plate 5a. Each of the openings 7a is substantially cylindrical in shape and of axis parallel to the axis of rotation X. Thus, the centers of the openings 7a lie on a common circle centered on the center of the first end plate 5a, which center is situated on the axis of rotation X.

The second end plate 5c and the intermediate plate 5b have respective openings 7c and 7b facing the openings 7a in the first end plate 5a. In some embodiments, the openings 7b and 7c are substantially identical in shape and size to the openings 7a. Thus, the openings 7b and 7c are cylindrical in shape and are symmetrically distributed around the axis of rotation X in the vicinity of the outer periphery of the intermediate plate 7b and of the second end plate 5c. In the same manner, the centers of the openings 7b and 7c lie on respective common circles centered on the centers of the intermediate plate 5b and of the end plate 5c respectively.

Figure 2:
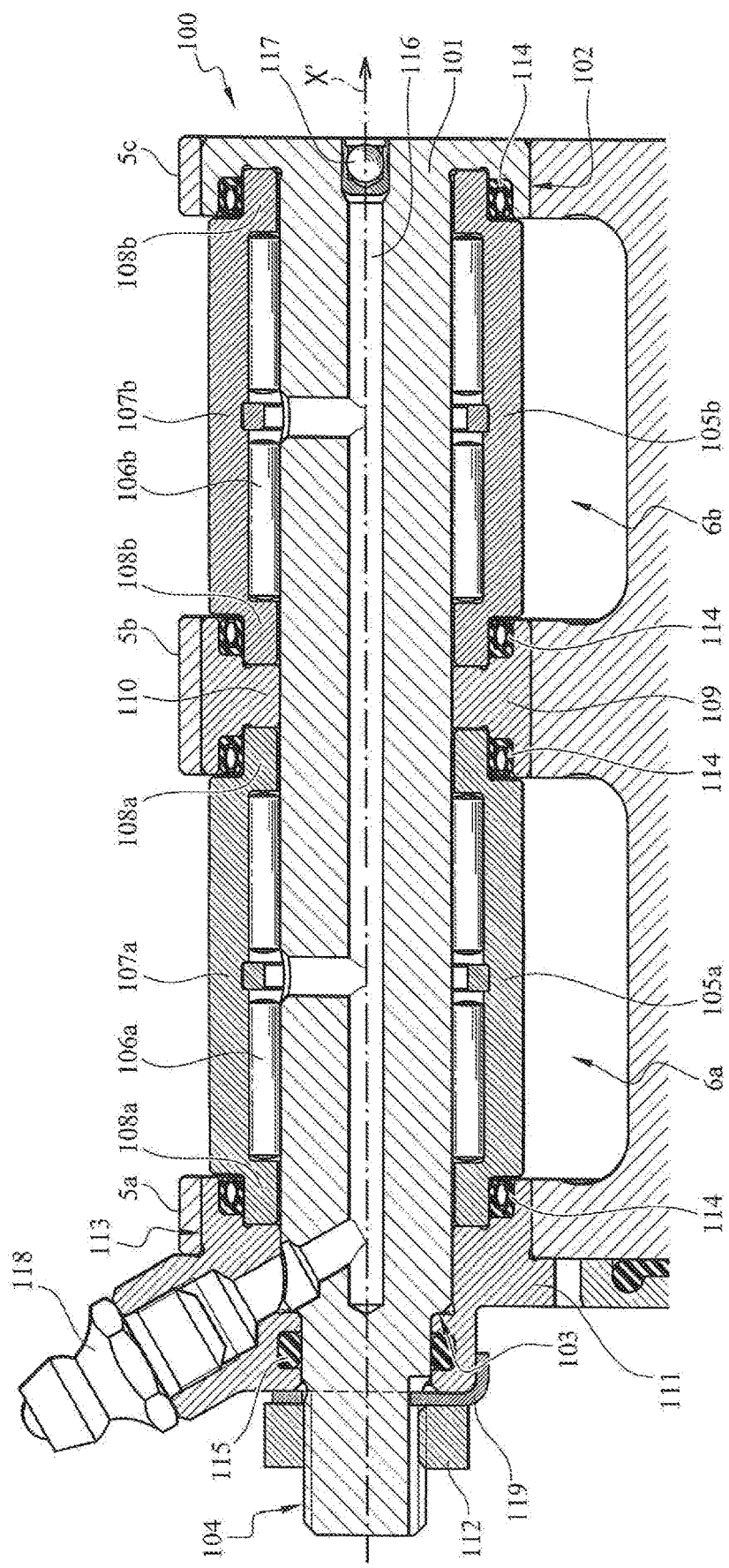
FIG. 2 is a view of one of the obstacles of the gearing element shown in FIG. 1, in section on a plane containing the axis of rotation of the gearing element and the longitudinal axis of the obstacle.

With reference to FIG. 2, each obstacle 100 comprises a pin 101 having a main segment with one end provided with a projecting collar defining a first shoulder 102 and its other end provided with a threaded portion 104 of smaller diameter and that is connected to the central segment by a second shoulder 103. In these embodiments, the length and the diameter of the collar defining the first shoulder 102 are respectively substantially similar to the thickness and to the diameter of the openings 7c in the end plate 5c.

In some embodiments, a first roller 105a and a second roller 105b substantially identical to the first roller 105a are mounted to be rotatably movable about the axis 101 respectively via a first rolling bearing 106a and a second rolling bearing 106b substantially identical to the first bearing 106a. The first and second bearings 106a and 106b in this example are needle bearings, each having two rows of needles of substantially similar size. In use, these bearings 106a and 106b act as a rotary guide for the rollers 105a and 105b, respectively. In other embodiments, these rotary guides may be any suitable bearing, such as a needle bearing, or other rotary guide means.

In some embodiments, the first and second rollers 105a and 105b have central tubular portions 107a and 107b together with substantially identical tubular end portions 108a and 108b extending along the axis 101. The dimensions of the central tubular portions 107a and 107b are greater than the dimensions of the tubular end portions 108a and 108b, such that the first and second rollers 105a and 105b act as outer necks for the first and second bearings 106a and 106b. The outside diameter of the central tubular portions 107a and 107b is nevertheless smaller than the outside diameter of the first shoulder 102.

In the illustrated embodiments, the first and second rollers 105a and 105b are spaced apart by an intermediate blocking smooth bearing 109 of annular shape centered on the axis 101. The length and the outside diameter of the intermediate blocking bearing 109 are respectively substantially similar to the thickness and to the diameter of the openings 7b in the intermediate plate 5b. Consequently, the length of the intermediate blocking bearing 109 is substantially twice the length of the first shoulder 102.

In some embodiments, the intermediate blocking bearing 109 is provided on the inside with a shoulder 110 of diameter substantially equal to the diameter of the pin 101 and shaped to receive on one side one of the tubular end portions 108a of the first roller 105a and on the other side one of the tubular end portions 108b of the second roller 105b. The tubular end portions 108a and 108b are of similar dimensions, so the intermediate blocking bearing 109 is symmetrical about a plane perpendicular to the axis 101 and passing through the middle of the shoulder 110.

In the same manner, in some embodiments, the first shoulder 102 of the pin 101 is shaped to receive the other one of the tubular end portions 108b of the second roller 105b. The second roller 105b is thus held against moving in translation by the intermediate blocking bearing 109 and by the first shoulder 102 of the pin 101.

In some embodiments, a removable lateral blocking smooth bearing 111 bears against the second shoulder 103 of the pin 101 and is shaped, as above, to receive the other one of the tubular end portions 108a of the first roller 105a. The first roller 105a is thus held stationary in translation by the intermediate blocking bearing 109 and by the lateral blocking bearing 111. The lateral blocking bearing 111 in this example is held in position against the second shoulder 103 by a nut 112 screwed onto the threaded portion 104.

In the illustrated embodiments, the end of the lateral blocking bearing 111 receiving a tubular end portion 108a of the first roller 105a has a tubular portion 113. The length and the outside diameter of the tubular portion 113 are substantially similar respectively to the thickness and to the diameter of the openings 7a in the end plate 5a. Consequently, the length of the tubular portion 113 is substantially equal to the length of the first shoulder 102.

In some embodiments, the lateral blocking bearing 111, the intermediate blocking bearing 109, and the first shoulder 102 are shaped to receive dynamic gaskets 114 of a single acting rod seal, such as a TURCON® VARISEAL® of type W, available from Trelleborg Sealing Solutions Midwest, 20 North Martingale Road, Suite 210, Schaumburg, Ill. 60173, to provide sealing for the obstacle 100. For this purpose, the dynamic gaskets 114 are in contact with the tubular end portions 108a and 108b of the first and second rollers 105a and 105b.

For a similar reason, the end of the lateral blocking bearing 111 is shaped to receive an O-ring 115 in contact with the pin 101. Under such circumstances, the lifetime of the needle bearings, and thus of the rollers, is therefore lengthened.

In the illustrated embodiments, the pin 101 has a channel 116 extending internally along the longitudinal axis X' of the pin 101. The channel 116 communicates with the first and second rolling bearings 106a and 106b between the two rows of needles. One end of the channel 116 opens out to the end of the pin 101 that has the first shoulder 102. Such an end of the channel 116 is obstructed by a leak-tight plug 117, such as a KOENIG® type plug available from SFC KOENIG LLC, 73 Defco Park Road, North Haven, Conn. 06473. The channel 116 is extended in the lateral blocking smooth bearing 111 that is shaped to receive a grease fitting 118 including a check valve. The grease fitting 118 is screwed on and permanently fastened to the lateral blocking bearing 111. The grease fitting 118 thus serves to cause lubricants to flow along the channel 116 for the purpose of ensuring that the bearings 106a and 106b operate correctly in order to ensure free rotation of the rollers 105a and 105b when loaded, and to do so without dismantling any element of the gearing element 1. In the embodiments described herein, the lubricants suitably includes oils, petroleum fractions, synthetic or non-synthetic grease, graphite, and any other suitable material.

The lateral blocking bearing 111 is properly positioned angularly by a brake washer 119 with a flap, the principle of which is not explained herein since it is well known to the person skilled in the art.

In the illustrated embodiment, the gearing element 1 shown in FIG. 1 has eleven obstacles 100 that are inserted in the support 3 by being moved in translation along the longitudinal axis X' of each of the obstacles. The openings 7a, 7b, and 7c in the plates 5a, 5b, and 5c, respectively, receive the tubular portion 113 of the lateral blocking bearing 111, the intermediate blocking bearing 109, and the first shoulder 102 of the pin 101.

In these embodiments, each of the obstacles 100 is held in the support 3 by four screws 120. For this purpose, the shanks of the screws 120 pass through the lateral blocking bearing 111 along respective axes parallel to the longitudinal axis X'. The threaded portions of the screws 120 are screwed into tapped holes 121 in the end plate 5a that are distributed around the opening 7a. The heads of the screws 120 face towards the outside of the gearing element 1, so access thereto is made easier. Of course, other non-permanent fasteners may be practiced with embodiments of the present disclosure. For example, in addition to screws, bolts, rivets, nails, shanks, pins, studs, or any other suitable fastener means may be used.

Rotation of the gearing element 1 about its axis then gives rise in turn to rotation of the toothed ring 2, with the obstacles 100 coming successively into contact with the teeth of the toothed ring 2. The first and second rollers 105a and 105b of each of the obstacles serve in particular to co-operate, without slip, with the two rows of teeth of the toothed ring 2. In some embodiments, the teeth of the toothed ring 2 are shaped to co-operate without clearance with the rollers 105a and 105b.

The gearing element 1 and the toothed ring 2 thus form a straight spur gearing, in which the rollers 105a and 105b rotate about the axis of rotation X of the gearing element 1 while also rotating about their respective longitudinal axes X'.

The intermediate bearing 109 serves to stiffen the pin 101 so as to prevent any flexing of the pin 101 under gearing forces.

When one of the rollers 105a and 105b is damaged or worn to such an extent that proper operation of the gearing element 1 is put into doubt, it is not necessary to replace the entire gearing element 1 or to dismantle it from its device in order to repair it. Specifically, it is possible to replace solely the obstacle 100 in question by separating it from the element 3, by removing the fasteners (e.g., unscrewing the four screws 120) and moving the obstacle 100 in translation along its longitudinal axis X'. The time required for maintenance is thus greatly shortened from conventional RPS pinions since there is no longer any need to dismantle the entire gearing element 1.

In a motor-driven wheel of an aircraft fitted with a gearing element 1, the rollers 105a and 105b are subjected to heavy loads that can be sudden, in particular when starting or stopping the gearing. This means that the risks of the rollers 105a and 105b becoming damaged or worn are large. The use of a gearing element 1 as described above makes it possible to replace an obstacle 100 in poor condition quickly with another obstacle 100 in perfect operating condition. The down time needed by the aircraft on the ground for repairing the gearing element 1 is thus shortened, thereby decreasing the cost of maintaining and operating the aircraft.

The present disclosure is not limited to the embodiment described but covers any variant coming within the ambit of the disclosure as defined by the claims.

Although the gearing element 1 is shown as a pinion in FIG. 2, it is within the scope of the present disclosure for the diameter of the gearing element 1 to be greater than the diameter of the toothed ring 2.

Although the gearing element 1 in this exemplary embodiment co-operates with the toothed ring 2, in other embodiments, the gearing element 1 co-operates with a rack. Although the obstacle 100 shown in FIG. 1 is depicted with two rollers, in other embodiments, the obstacle 100 suitably has one roller or more than two rollers, e.g. in order to co-operate with a toothed wheel having only one row of teeth or else having more than two rows of teeth.

In some embodiments, the gearing element 1 may include a key, notch, guide or other keying means in order to ensure proper angular positioning of the obstacles 100 to ensure that the openings 7a, 7b, and 7c in the plates 5a, 5b, and 5c lie on common axes.

Although the diameters of the openings 7a, 7b, and 7c are substantially identical in this example, in other embodiments, the openings 7a, 7b, and 7c may differ from one plate to another providing the openings 7a, 7b, and 7c do not impede assembling the obstacles 100 on the gearing element support 3. Thus, in some embodiments, the openings 7a are of a diameter greater than or equal to the diameter of the openings 7b, the diameter of the openings 7b then being greater than or equal to the diameter of the openings 7c. In the same manner, the diameter of the openings 7b may be greater than or equal to the diameter of the openings 7c, the diameter of the openings 7a then being greater than or equal to the diameter of the openings 7b. In the same manner, the diameter of the openings 7a may be greater than or equal to the diameter of the openings 7c, the diameter of the openings 7b then being greater than or equal to the diameter of the openings 7c and less than or equal to the diameter of the openings 7a.

Although the diameters of the openings 7a, 7b, and 7c in this example are substantially identical from one plate to another, in some embodiments, the openings 7a may be of a diameter greater than or equal to the diameter of the openings 7b, the diameter of the openings 7b then being greater than or equal to the diameter of the openings 7c. Likewise, the diameter of the openings 7b may be greater than or equal to the diameter of the openings 7c, the diameter of the openings 7a then being greater than or equal to the diameter of the openings 7b. It then continues to be possible to mount the obstacles on the support 3 of the gearing element. Thus, in some embodiments, the diameter of the tubular portion 113 of the blocking smooth bearing 111 may be greater than or equal to the diameter of the intermediate blocking bearing 109, the diameter of the intermediate blocking bearing 109 then being greater than or equal to the diameter of the first shoulder 102.

In other embodiments, the openings 7a, 7b, and 7c in the plates 5a, 5b, and 5c may be any suitable shape other than circular, described above, providing they are shaped to match the means for blocking the rollers 105a and 105b.

In some embodiments, the first shoulder 102 of the pin 101 may be replaced by a removable blocking bearing.

In some embodiments, the rolling bearings 106a and 106b may be of a type other than that shown in FIG. 2, specifically needle bearings having two rows of needles.

In some embodiments, the support may be made as a single piece, by machining, or as a plurality of pieces. With a plurality of pieces, the plates may for example be fitted onto the central core and then welded thereto; alternatively they may be assembled in releasable manner, e.g., by providing fluting for preventing the plates from turning relative to the central core, together with threaded and/or tapped elements for holding them axially in position.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A gearing element, comprising:
   a support having mounted thereon a plurality of obstacles for co-operating with teeth of a neighboring gearing element, each obstacle comprising:
   a pin;
   a roller mounted to rotate about the pin via a rotary guide;
   a plurality of blocking bearings mounted on the pin and shaped to prevent the roller from moving in translation along the pin; and
   one or more fasteners configured to fasten at least one of the blocking bearings to the support,
   wherein each obstacle is preassembled outside of the support before being inserted in the support by being moved in translation along a longitudinal axis of the pin.

2. The gearing element of claim 1, wherein the support further comprises a central core having ends each carrying an end plate provided with a plurality of openings, each opening configured to receive a portion of the blocking bearings.

3. The gearing element of claim 2, wherein each obstacle further comprises two rollers with an axial space there between receiving a portion of the blocking bearing, and wherein the support has an intermediate plate with a plurality of openings, said openings in the intermediate plate facing the openings in the end plates, and each of the openings in the intermediate plate and the openings in the end plate receiving said portion of the blocking bearing.

4. The gearing element of claim 1, wherein the rotary guide comprises a rolling bearing.

5. The gearing element of claim 4, wherein the rolling bearing is a needle bearing.

6. The gearing element of claim 1, wherein at least one of the blocking bearings comprises a nut and a blocking neck centered on the pin, the nut configured to be screwed onto a threaded end of the pin to secure the blocking neck against a shoulder of the pin.

7. The gearing element of claim 1, wherein the blocking bearings are shaped to receive dynamic gaskets arranged to provide sealing between the roller and the pin of the obstacle.

8. The gearing element of claim 1, further including a lubrication channel configured and arranged to supply lubrication to the rotary guide.

9. The gearing element of claim 1, wherein at least one of the obstacles includes lubrication means for lubricating the rotary guide.

10. The gearing element of claim 9, wherein the lubrication means comprise a channel extending inside the pin and penetrating into one of the blocking bearings arranged to receive a grease fitting, the channel communicating with the rotary guide.

11. The gearing element of claim 1, wherein each of the one or more fasteners comprises a screw, the screw having a shank configured to pass through one of the blocking bearings and a threaded portion screwed into the support.

12. A gearing element, comprising:
- a support having mounted thereon a plurality of obstacles for co-operating with teeth of a neighboring gearing element, each obstacle comprising:
  - a pin;
  - a roller mounted to rotate about the pin via rotary guide means;
  - a plurality of blocking bearings mounted on the pin and shaped to prevent the roller from moving in translation along the pin; and
- fastener means for fastening at least one of the blocking bearings to the support,
- wherein each obstacle is preassembled outside of the support before being inserted in the support by being moved in translation along a longitudinal axis of the pin.

\* \* \* \* \*